(12) United States Patent
Steinmetz

(10) Patent No.: US 8,804,917 B2
(45) Date of Patent: Aug. 12, 2014

(54) SYSTEM AND METHOD FOR PROVIDING A PERSONALIZED IDENTITY TO A DESTINATION

(75) Inventor: Daphna Steinmetz, Ramat Gan (IL)

(73) Assignee: Comverse Ltd., Tel Aviv (IL)

( * ) Notice: Subject to any disclaimer, the term of this patent is extended or adjusted under 35 U.S.C. 154(b) by 2921 days.

(21) Appl. No.: 11/350,014

(22) Filed: Feb. 9, 2006

(65) Prior Publication Data

US 2006/0182245 A1    Aug. 17, 2006

Related U.S. Application Data

(60) Provisional application No. 60/651,621, filed on Feb. 11, 2005.

(51) Int. Cl.
*H04M 1/64* (2006.01)
*H04W 4/24* (2009.01)
*H04L 29/12* (2006.01)
*G06Q 10/10* (2012.01)
*H04M 15/06* (2006.01)
*H04M 15/00* (2006.01)
*H04M 1/57* (2006.01)
*H04M 3/42* (2006.01)
*H04M 1/725* (2006.01)

(52) U.S. Cl.
CPC ............ *H04M 3/42042* (2013.01); *H04W 4/24* (2013.01); *H04L 29/12594* (2013.01); *H04L 61/30* (2013.01); *H04M 2215/2026* (2013.01); *G06Q 10/10* (2013.01); *H04M 1/72563* (2013.01); *H04M 2215/32* (2013.01); *H04M 15/06* (2013.01); *H04M 15/68* (2013.01); *H04M 1/576* (2013.01); *H04M 15/00* (2013.01); *H04L 29/12009* (2013.01); *H04M 1/72544* (2013.01); *H04M 2215/0196* (2013.01)
USPC ........................................ 379/67.1; 379/88.13

(58) Field of Classification Search
USPC .................................. 379/67, 67.1, 88.13
See application file for complete search history.

(56) References Cited

U.S. PATENT DOCUMENTS 7,352,692 B1 *   4/2008   Saleh et al. .................... 370/216
2004/0165703 A1 *   8/2004   Jones .......................... 379/88.13

\* cited by examiner

*Primary Examiner* — Amal Zenati
(74) *Attorney, Agent, or Firm* — Ohlandt, Greeley, Ruggiero & Perle, L.L.P.

(57) ABSTRACT

An identification manager provides a user-generated identity of an initiating party during a connection to a destination. The identification manager includes an identity store for storing user-generated identities, and an identity provider associated with the identity store, for retrieving, from the identity store, a user-generated identity of the initiating party, and for providing the retrieved identity to the destination. Prior to delivery of the retrieved identity to the destination, the identity provider may sense connection characteristics, such as the network type and terminal capabilities of the destination party, and adapt the initiating party's identity to the sensed characteristics.

The identification manager may also include a provisioning system for users to generate multimedia identities by various mechanisms. Identity provisioning may be performed automatically, as user replies to system initiated IVR calls, MMS messages and/or SMS messages. Additional provisioning mechanisms include a user-initiated provisioning system for users to generate multimedia identities over the Web, as well as a dedicated identity-provisioning client, for generating an identity on the user device or terminal.

24 Claims, 15 Drawing Sheets

Figure 5

SYSTEM AND METHOD FOR PROVIDING A PERSONALIZED IDENTITY TO A DESTINATION

RELATED APPLICATIONS

This application claims the benefit of U.S. Application No. 60/651,621, filed Feb. 11, 2005, which is herein incorporated in its entirety by reference.

FIELD AND BACKGROUND OF THE INVENTION

The present invention relates to providing user-generated identities to destination parties, and, more particularly but not exclusively, to providing the user-generated identity over a telecommunication network. The present invention is applicable to both voice and data traffic, and to a wide variety of networks, including fixed and mobile telephone, wireless fidelity (WiFi), cable and broadband networks.

In a world with a wide variety of communication services, there is a growing desire of users for ways to personalize their contacts with others. There is a strong drive to personalize communications, so that individuals can make strong statements about who they are. Users want to easily express their identity, uniqueness and preferences to their contacts, in different communities of friends, business environments, and service providers.

At present, users are already beginning to utilize the mechanisms which are currently available to them in order to create a self-identity which represents them to others and to themselves. However, these mechanisms are currently extremely limited.

In the telephony environment, cellular telephone designers and operators provide users with many tools to personalize their own telephones. Users can download wallpapers, screen savers, ring tones, video clips, games, and more. However, these items are useful for personalizing one's own telephone, not for use as an identity to the outer world. There is no simple mechanism allowing a user to share their self-expression with others. The downloaded items are stored locally on the user's telephone, and are not externalized to others. The user must manually send downloaded items to another caller. There is also no automatic way for a user to tailor a personalized communication to a specific contact or group of contacts.

An additional method of user self-expression is the use of images in applications such as Web instant messaging. The user selects a ready image, captures an image, or designs an image by selecting a face, clothing, background and so forth using an avatar design application. The image/avatar is then available for use in a narrow range of applications. For example, Yahoo® has an avatar design studio for users to design avatars to be displayed to messaging partners over Yahoo® Messenger. The avatar is automatically displayed to others during messaging. The avatar is limited to web instant messaging, and is limited to images only. The avatar does not serve as an automatic identity for multiple communication vehicles and applications, nor over different terminals and networks. Similar avatars are available, such Vodafone's WeeMee™ and MSN Messenger's Dudefactory, however they suffer from the same limitations.

There is thus a widely recognized need for, and it would be highly advantageous to have, a system and method for providing user-generated identities to a destination, devoid of the above limitations.

SUMMARY OF THE INVENTION

According to a first exemplary embodiment of the present invention there is provided an identification manager which provides a caller-generated identity of a calling party to a destination over a telephone connection. The identification manager includes an identity store for storing caller-generated identities, and an identity provider associated with the identity store, for retrieving, from the identity store, a generated identity of the calling party, and for providing the retrieved identity to the destination.

According to a second exemplary embodiment of the present invention there is provided an identification manager which provides a user-generated identity of an originating party during a connection to a destination. The identification manager includes an identity store for storing user-generated identities, and an identity provider associated with the identity store, for retrieving, from the identity store, a user-generated identity of the originating party, and for providing the retrieved identity to the destination in accordance with characteristics of the connection and/or of the called party.

According to a third exemplary embodiment of the present invention there is provided a presentation client for a communication device, for the presentation of a caller-generated identity. The presentation client includes a connection monitor for identifying an incoming connection as having an associated caller-generated identity, an identity obtainer for obtaining the caller-generated identity, and an identity presenter for presenting the caller-generated identity on the communication device.

According to a fourth exemplary embodiment of the present invention there is provided a communication device with caller-identity presentation. The communication device includes a connection monitor for identifying an incoming connection as having an associated caller-generated identity, an identity obtainer for obtaining the caller-generated identity, and an identity presenter for presenting the caller-generated identity on the communication device.

According to a fifth exemplary embodiment of the present invention there is provided a communication device presentation client embodied on a computer-readable medium, for the presentation of a caller-generated identity on a communication device. The presentation client includes a connection monitoring routine adapted for identifying an incoming connection as having an associated caller-generated identity, an identity obtainer routine adapted for obtaining the caller-generated identity, and an identity presenter routine adapted for presenting the caller-generated identity on the communication device.

According to a sixth exemplary embodiment of the present invention there is provided a generation client for a communication device for generating user-identities. A user may have a single identity or several identities associated with various communities. The generation client includes an identity designer for receiving user input to define a user-identity on the communication device and for defining the user identity according to the received user input, and an identity sender for sending the user-identity to an identity server.

According to a seventh exemplary embodiment of the present invention there is provided a communication device generation client embodied on a computer-readable medium, for generating a user identity or identities. The generation client includes an identity definition routine adapted for receiving user input to define the user-identity on the communication device and for defining the user identity in accordance with the received user input, and an identity storing routine adapted for sending the user-identity for storage in a database.

According to a eighth exemplary embodiment of the present invention there is provided a communication device with user-identity generation capabilities. The communication device includes an identity designer for receiving user input to define the user-identity on the communication device and for defining the user identity in accordance with the received user input, and an identity sender associated with the identity designer for sending the user-identity for storage in a database.

According to a ninth exemplary embodiment of the present invention there is provided an identity pull-provisioner for user-generation of a stored identity, the identity being for providing a user-generated identity of an originating party during a connection to a destination. The pull-provisioner includes a query unit for querying a user for at least one portion of the user-generated identity, and an identity updater for incorporating a user response into a respective stored identity.

According to a tenth exemplary embodiment of the present invention there is provided a method for providing a caller-generated identity of a calling party to a destination over a telephone connection. The method includes the steps of: defining the caller-generated identity in accordance with information provided by the calling party, and providing the caller-generated identity to the destination upon establishment of a telephone connection between the calling party and the destination.

According to a eleventh exemplary embodiment of the present invention there is provided a method for providing a user-generated identity of an originating party during a connection to a destination. The method includes the steps of identifying an originating party and a destination of the connection, and providing the identity of the originating party to the destination in accordance with characteristics of the connection.

According to a twelfth exemplary embodiment of the present invention there is provided a method for the presentation of a caller-generated identity on a communication device. The method includes the steps of: identifying an incoming connection as having an associated caller-generated identity, obtaining the caller-generated identity, and presenting the caller-generated identity on the communication device, in coordination with the incoming connection.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or operations manually, automatically, or a combination thereof. Moreover, according to actual instrumentation and equipment of preferred embodiments of the method and system, several selected operations could be implemented by hardware or by software on any operating system of any firmware or a combination thereof. For example, as hardware, selected operations could be implemented as a chip or a circuit. As software, selected operations could be implemented as a plurality of software instructions being executed by a computer using any suitable operating system. In any case, selected operations of the method and system could be described as being performed by a data processor, such as a computing platform for executing a plurality of instructions.

BRIEF DESCRIPTION OF THE DRAWINGS

Preferred embodiments are herein described, by way of example only, with reference to the accompanying drawings.

With specific reference now to the drawings in detail, it is stressed that the particulars shown are by way of example and for purposes of illustrative discussion of the preferred embodiments only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a simplified block diagram of an identification manager, according to a preferred embodiment of the present invention.

FIG. 2 illustrates the delivery of a caller identity during a mobile telephone call between a caller and a destination.

FIG. 3 is a simplified diagram of an exemplary system for providing an identity to a destination in coordination with a telephone call, over an intelligent network.

FIG. 4 is a simplified block diagram of an identity provisioner, according to a preferred embodiment of the present invention.

FIG. 5 illustrates an example of a list of identity information, as stored in the identity store.

FIG. 6 is a simplified block diagram of a pull-provisioner for user-generation of a stored identity, according to a preferred embodiment of the present invention.

FIG. 7 shows an example of a form for user design of an identity.

FIG. 8 shows an example of an avatar design page.

FIG. 9 illustrates an exemplary system permitting identity design from multiple input devices and over different types of communication networks and protocols.

FIG. 10 is an exemplary embodiment of an identity studio which receives identity information from cellular telephone handsets with an installed client.

FIG. 11 is a simplified block diagram of a communication device with identity display capabilities, according to a first and second preferred embodiments.

Figure 12:
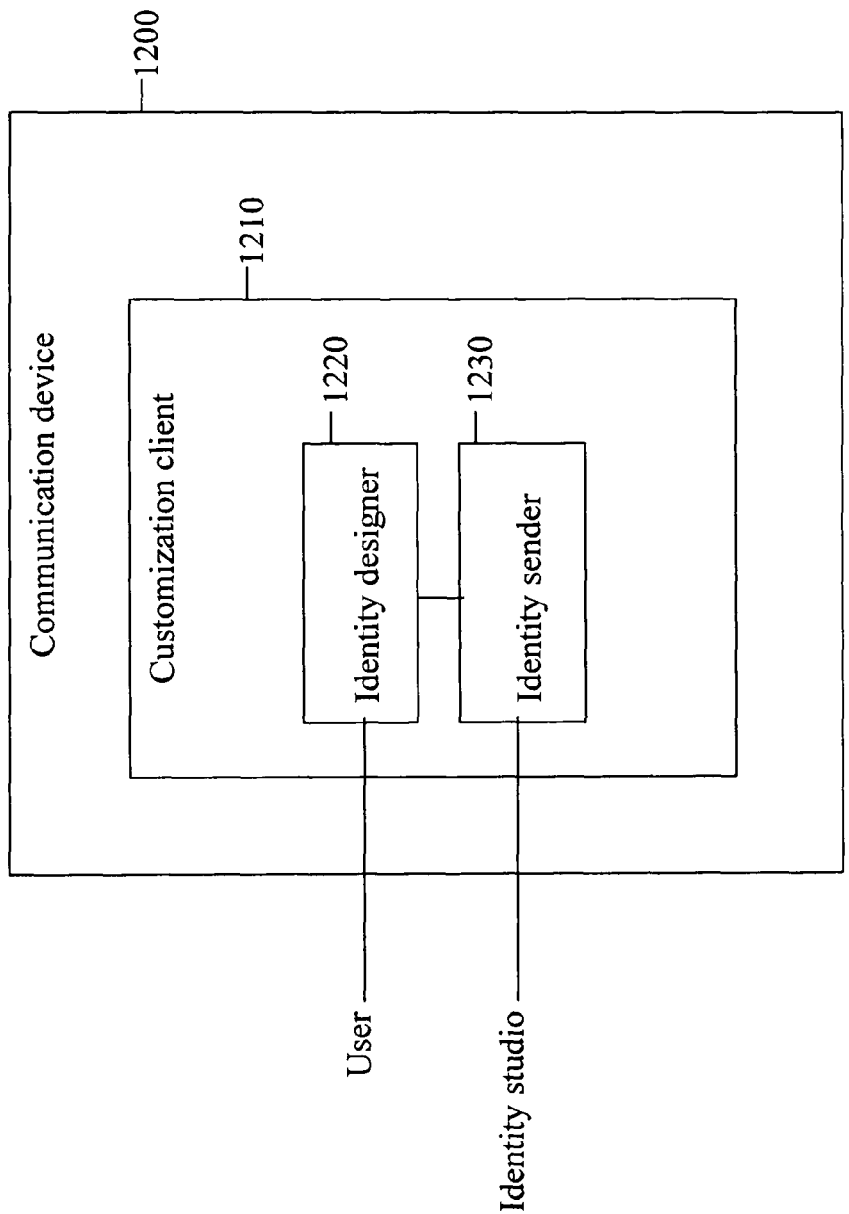

FIG. 12 is a simplified block diagram of a communication device with identity generation capabilities, according to a first and second preferred embodiments.

Figure 13:
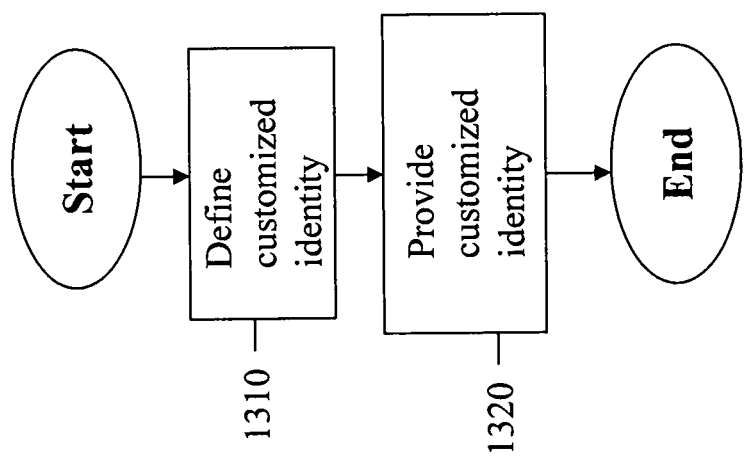

FIG. 13 is a simplified flowchart of a method for providing a caller-generated identity of a calling party to a destination over a telephone connection, according to a preferred embodiment of the present invention.

Figure 14:
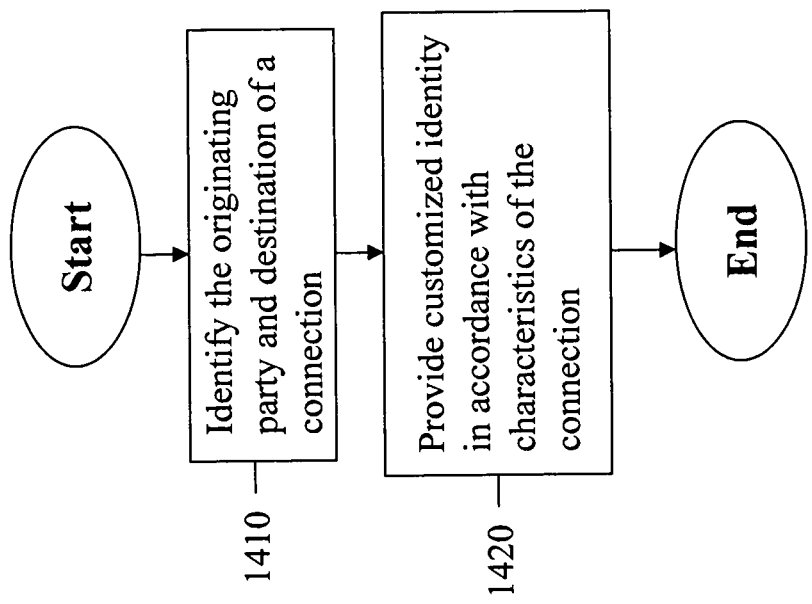

FIG. 14 is a simplified flowchart of a method for providing a user-generated identity during a connection to a destination, according to a preferred embodiment of the present invention.

Figure 15:
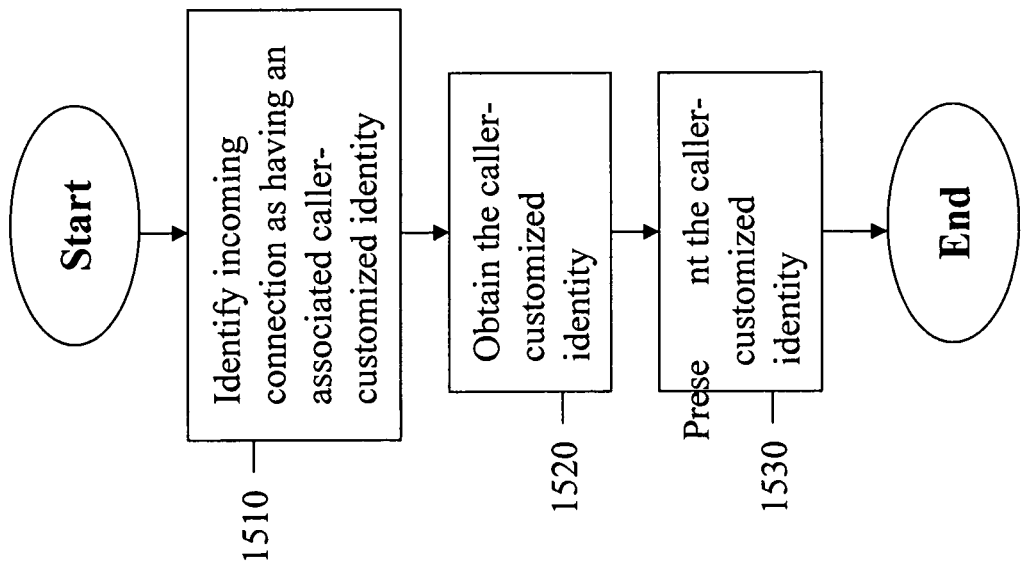

FIG. 15 is a simplified flowchart of a method for the presentation of a caller-generated identity on a communication device, according to a preferred embodiment of the present invention.

DESCRIPTION OF THE PREFERRED EMBODIMENTS

The present embodiments teach a personalized identity which is provided to a destination device when a communication connection is made. Specifically, the present embodiments teach allowing a user to generate an identity or identities, which are stored in a centralized database (denoted herein the identity store). When the connection is made, the initiator's identity is retrieved from the identity store, adapted to the type and conditions of the connection, and provided to the destination device. The identity may thus be displayed at the destination, even if the caller is not registered in the called party's address book. A user-generated identity may combine several media types. Additionally, a user may have multiple identities, each one designed for a specific addressee or community (i.e. group of addressees).

The identity which is displayed at the destination is an expression of the caller's identity. In a telephony context, the initiator identity may serve as an incoming call notification which is displayed by the destination device when a telephone connection is established. When the call is made, the destination device may display a photograph, play a voice message, and/or play a music clip all selected by the caller. This is in contrast with current methods of ring tone selection, in which it is the called party who determines what tone will be played for a given caller or group of callers. The user-generated identity (or identities) serves as a personalized caller signature, which serves as a statement that identifies the caller to other callers/users.

In the embodiments presented below, a central server stores and manages user details in the network, and provides the user details signature to the destination party. The stored details are used to create a user profile, or several profiles customized for different groups of addressees, which may be tailored, during delivery, to suit the dynamic environment for many destinations, services and purposes.

The principles and operation of a user-generated identity according to the embodiments may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

In the following, parts that are the same as those in previous figures are given the same reference numerals and are not described again except as necessary for an understanding of the present embodiment.

For purposes of explanation, the following discussion of identification management and delivery to a destination is first directed to the non-limiting context of a telephone connection, in which the user-generated identity serves as an announcement of an incoming call from the originating/calling party (denoted herein the caller). It is noted that the user-generated identity may be provided for other types of services (i.e. instant-messaging) and during other time periods (i.e. for the entire duration of the connection). In the following, the term "caller" is used interchangeably with the terms "user" and "originating party" depending upon context, as are the terms "destination", "addressee" and "destination device". Likewise, the terms "caller-generated identity" "user-generated identity" and "identity" are used interchangeably according to context, as are the "delivery" and the "providing" of an identity. It is noted that the term "connection" refers to any form of communication between an originating party and a destination, and is not limited to instances in which a specific communication path is established and maintained for the duration of the communication.

Figure 1:
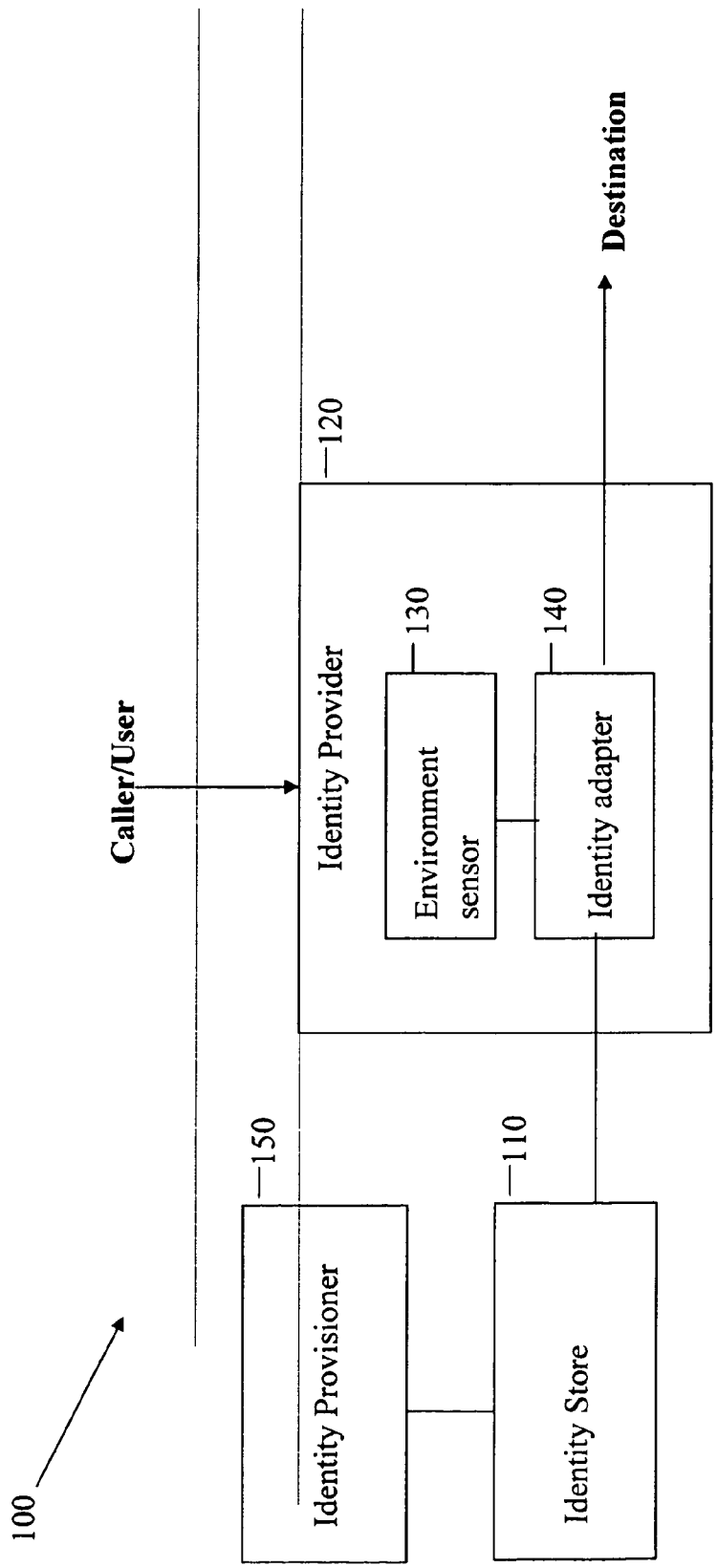

Reference is now made to FIG. 1, which is a simplified block diagram of an identification manager, according to a preferred embodiment of the present invention. Identification manager 100 provides a caller-generated identity to a destination over a telephone connection. Identification manager 100 includes identity store 110 and identity provider 120. Identity store 110 is a central network storage for user-generated identities, preferably with management capabilities for network operators. Identity provider 120 is responsible for sensing the environment, for adjusting the identity to environment conditions, and for providing delivery mechanisms for in-call services and for background identification services. In the preferred embodiment, identification manager 100 is further responsible for identifying the destination of the connections and selecting the appropriate user identity for the given destination. When a telephone connection is made from a calling party to a destination, identity provider 120 retrieves the appropriate identity of the originating party from identity store 110, and provides the retrieved identity to the destination. The user identity record is generally providable using multiple access mechanisms. As discussed below, identity provider 120 may further adapt the provided identity to the conditions of the current communication. The destination device may have embedded identity display-capabilities or may utilize a client in order to display the identity to the called party.

Figure 2:
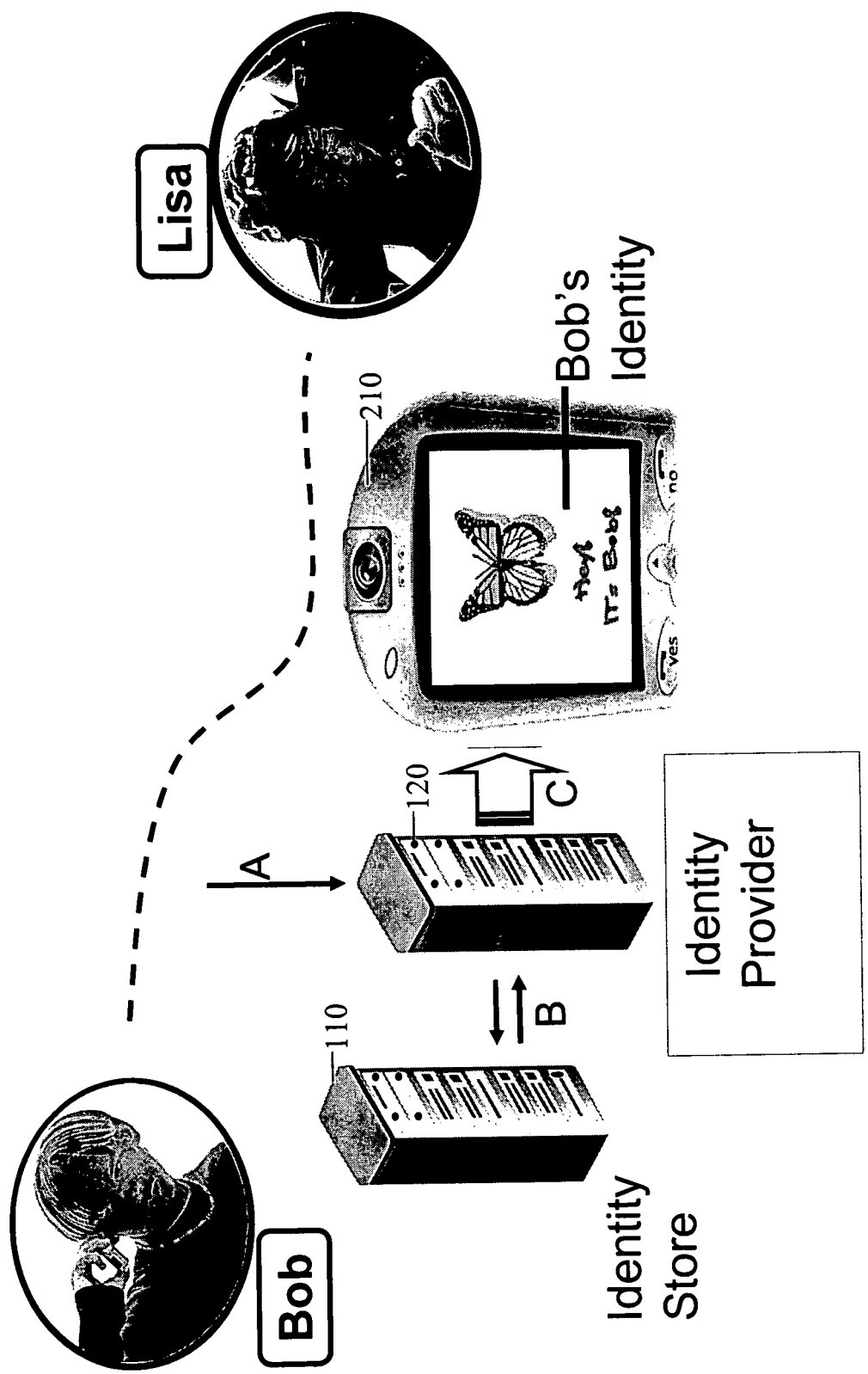

Reference is now made to FIG. 2, which illustrates the delivery of a caller identity during a mobile telephone call between a caller (Bob) and a destination (Lisa). When Bob calls Lisa, identity provider 120 is notified that a connection is being established between the two parties. Identity provider 120 retrieves Bob's identity from identity store 110, and provides Bob's identity to Lisa's telephone 210. Lisa is notified of the incoming call by a message and image selected by Bob. This is in contrast with current mobile telephone capabilities, in which it is Lisa who selects the ring tone to be played when she is called by Bob.

A user identity may be composed of many components, which together form a personalized multi-media identity. The user-generated identity preferably includes at least one of the following: caller name and/or text message, ring tone, icon, voice message, avatar, audio clip, video clip, animated Graphic Image File (GIF), photograph, logo, handwritten signature, and image. The user may also customize the identity design, for example by selecting a color for the text message and handwritten signature. The user identity may further include dynamically-updated information and/or a user profile and preferences. For example, the dynamically-updated information may be the user location, as determined by the mobile telephone operator. The mobile telephone operator may periodically update identity store 110 with a user location, which is entered by identity store 110 in a "user location" field of the given user's identity. The identity provided to the destination by identity provider 120 may thus include the current caller location based on the current information in the originating party's user location field. User preferences may define different signatures to be provided to different destinations.

Figure 3:
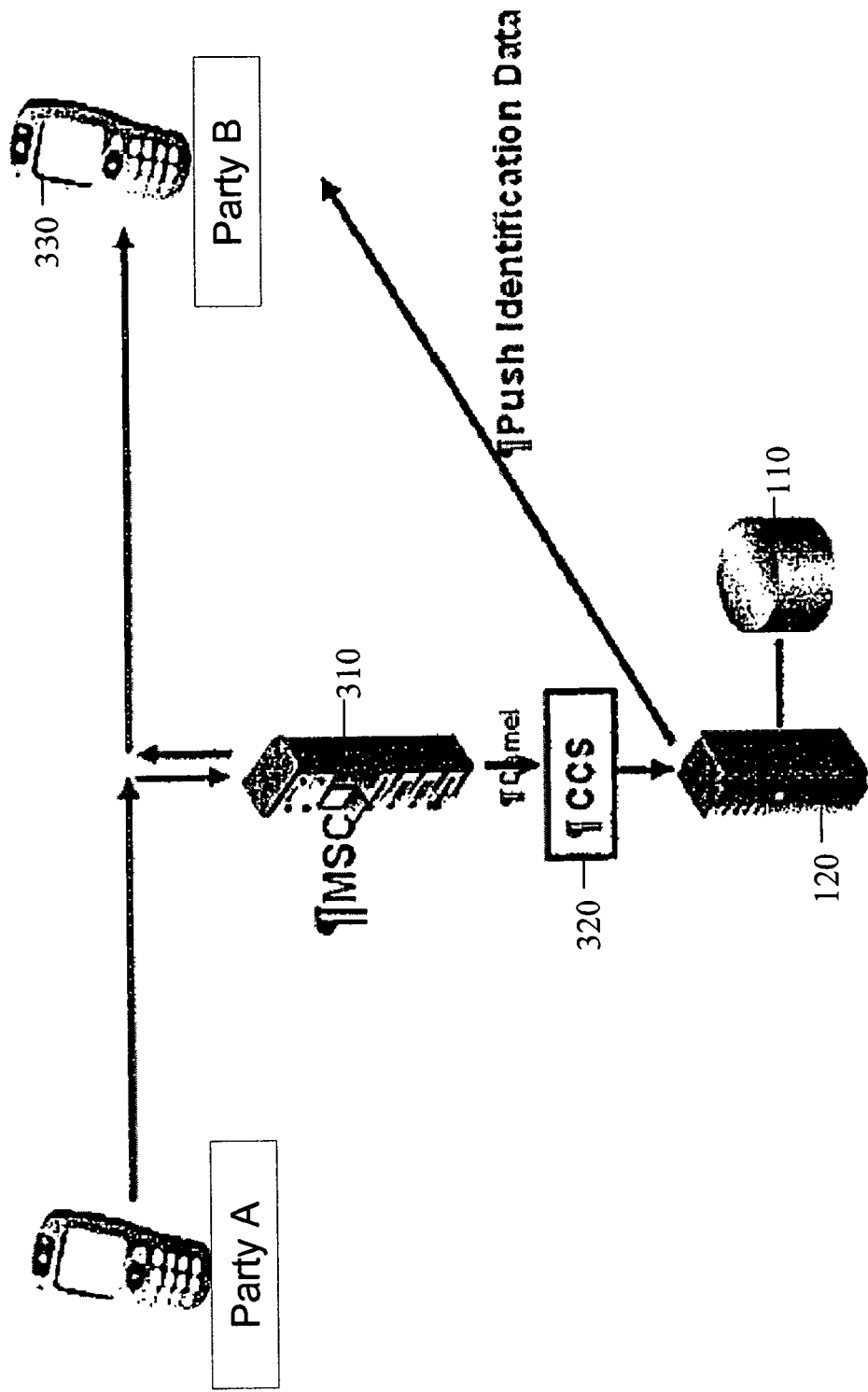

In a first exemplary embodiment, identity provider 120 pushes the caller identity to the destination device, preferably over a separate channel. FIG. 3 illustrates an example of identity-push by identity provider 120 to a destination telephone.

In a second exemplary embodiment, identity provider 120 provides the caller identity over the telephone connection in coordination with call delivery to the destination device. Identity delivery mechanisms preferably include one or more of: Short Message Service (SMS), Multimedia Message Service (MMS), voice message, email, data streaming, video, and audio.

In a third exemplary embodiment, identity provider 120 provides the caller identity during connection setup. For example, in IN Customized Applications for Mobile networks Enhanced Logic (CAMEL), a text-only message may be provided during call setup. Alternately, in IMS networks, a multimedia signature may be included in the Session Initiation Protocol (SIP) command that sets up the call. The identity may also be transferred by a handshaking protocol between the destination telephone device and identity provider 120. In an additional example, identity provider 120 provides the destination device with the identity address in the communication network, for example a Uniform Resource Locator (URL) or SIP URL. The destination device then retrieves the identity from the server at the specified address.

In a fourth exemplary embodiment, identity provider 120 initiates a parallel channel to the destination, and provides the caller identity over the parallel channel. The present embodiment is useful in Voice over IP (VoIP) and IP Multimedia Subsystem (IMS) connections, in which it is possible to establish parallel channels to the destination. Identity provider 120 sets up a data channel, which is used to provide the identity to the destination device. As discussed below, it may be necessary to hold the identity data while the target type is determined and the data format is adjusted to the destination device.

In a fifth exemplary embodiment, identity provider 120 transfers the caller identity to the destination as a portion of the telephone connection protocol, for example in a message header, body or footer.

In a sixth exemplary embodiment (applicable to networks such as IMS and type A terminal pre-IMS) when an incoming call is received at the destination device, the destination device queries identity provider 120. Identity provider 120 then responds by sending the caller identity to the destination device.

It is noted that identity provider 120 may utilize one or more of the abovedescribed identity delivery mechanisms.

Identity provider 120 is preferably configured to provide a caller identity over one or more types of telephone networks, including: Public Switched Telephone Network (PSTN), Public Land Mobile Network (PLMN), mobile telephone, Voice over IP (VoIP), Intelligent Network (IN), second generation wireless (2G), third generation wireless (3G), High Speed Packet Access (HSPA), Wireless Local Area Network (WLAN), Global System for Mobile communication (GSM), Code Division Multiple Access (CDMA), Signaling System 7 (SS7), broadband telephone, and cable telephone.

Referring again to FIG. 1, in the preferred embodiment identity provider 120 includes environment sensor 130 and identity adapter 140. Environment sensor 130 determines the characteristics of the connection and identity adapter 140 adapts the identity provided to the destination device to the determined characteristics. The identity provided to the destination can thus be tailored to provide an optimal presentation at the destination. Environment sensor 130 allocates information about parameters such as the destination device, network bandwidth and available identification media. Identification provider 120 preferably provides the caller identification to the destination device according to the allocated information. The identity delivery mechanism depends on the available network and communication protocols. For example, in present GSM networks the identification may be an Unstructured Supplementary Services Data (USSD) message or SMS message. In future IP-based networks the identity may be SIP-enveloped data.

In a first exemplary embodiment, the connection characteristics include the capabilities of the destination device. In an IMS network, the home subscription system (HSS) may provide the type and capabilities of the destination device to identity adapter 140. Identity adapter 140 may thus format or transcode the identity for presentation as required by the destination device and/or select a delivery mechanism (such as SMS, audio only, MMS, etc. . . . ) suitable for the destination device. The identity may also be designed for presentation by a given destination device client. For example, when a user-identity containing a Moving Picture Experts Group 4 (MPEG4) video clip is to be sent to a television, identity adapter 140 may transcode the video clip into an MPEG2 format suitable for display by, for example, a television.

In a second exemplary embodiment, the connection characteristics include the telephone network capabilities. For example, identity adapter 140 may adjust the provided identity according to the network bandwidth, configuration and/or congestion. Identity provider 120 may thus generally provide the identity as video, but provide the identity as text only at times of high congestion.

In a third exemplary embodiment, the connection characteristics include the current destination, or a group/community to which the current destination belongs. In the present embodiment, the user designs different identities for different addressees or groups of addressees. When a connection is made, identity adapter 140 determines the current destination and selects the appropriate user identity for delivery.

In a fourth exemplary embodiment, the connection characteristics include preferences of the addressee. The addressee may specify both static and dynamic preferences, which are used by identity adapter 140 to adjust the identity provided to the destination. For example, a user may give static information, such as whether he or she is willing to receive personalized identities in principle, or dynamic information, such as a current state (i.e. free, busy, silent, in a meeting, etc.), and agree to accept different portions of an originator-identity based on a current state. Identity adapter 140 adapts the provided identity to the destination preferences, for example by sending the user only a graphical portion of the signature when the state of the destination is "silent". In an exemplary embodiment, the user preferences component of a user identity may include preferences for how incoming identities should be displayed to the user, as well as how the user's identity should be provided to others for outgoing calls. Identity adapter 140 may thus determine the destination party's preferences by accessing the destination party's identity on identity store 110.

Environment sensor 130 and identity adapter 140 together permit identity provider 120 to optimize the identity delivery mechanism to characteristics of the current connection. Richness of the identity provided to the destination may vary in different networks and for different destination devices. For example, in Signaling System 7 (SS7) networks the provided identity may consist of a text message with minimum retrieval and adaptation time. More advanced telephone networks permit providing a fuller multimedia identity.

In the preferred embodiment identification manager 100 further includes a connection establisher, for establishing the telephone connection between the caller and the destination. For example, in VoIP the connection establisher may set up the channels between the caller and the destination. The connection establisher preferably coordinates the establishment of the telephone connection with the provision of the retrieved identity to the destination telephone, so that the provided identity serves as a notification of an incoming telephone call. Identification manager 100 may also include a telephony infrastructure for maintaining the telephone connection.

Reference is now made to FIG. 3, which illustrates an exemplary system for providing an identity to a destination in coordination with a telephone call, over an intelligent network. When party A initiates a call to party B the call is intercepted by Mobile Switching Center (MSC) 310, and is not forwarded to party B until environment sensing and identity push takes place or times out. Identification manager 100 senses the communication environment, and allocates information about destination device 330, network bandwidth and available identification media. The caller identity is transcoded to the format required by destination device 330. Depending on the available network and communication protocols, identity provider 120 selects a push mechanism and pushes the caller identity to destination device 330. Once party B acknowledges receipt of the identity, MSC 310 releases the call for 14 further processing and routing to party B. When the call reaches party B the pushed identity is used to notify B of the incoming call.

Preferably, identity provider 120 additionally provides the generated identity of the destination party to the calling party. Thus both sides of the connection view the identity of the other party.

In an additional preferred embodiment, identification manager 100 operates in concert with multiple types of networks and/or services, to provide a user identity to a destination in accordance with the characteristics of the connection between the originating and destination parties. In the present embodiment, identification manager 1100 is not limited to telephone services but may include other services such as instant-messaging, gaming, chat (including Comverse's Push-to-Show™ and Nextel's Push-to-Talk), Web-based services (such as dating and gaming) and call management services. Identity provider 120 is preferably configured with identity provision mechanisms for both telephone and data networks, including IP networks such as the Internet, fixed and mobile telephone, wireless fidelity (WiFi), cable and broadband networks.

In the present embodiment, environment sensor 130 determines the characteristics of the connection and identity adapter 140 adapts the provided identity to the determined characteristics, where the connection may include a variety of telephone and data services.

Characteristics of the connection preferably include one or more of:

1) The communication network environment and capabilities.
2) The capabilities of the destination device.
3) The type of service.
4) The destination (individual or community).
5) The destination preferences.

Identity provider 120 is thus capable of providing the destination device with the appropriate media to display, in accordance with the capabilities of the destination device, service type, destination, destination preferences, and/or network environment. Identity provider 120 preferably further includes a service interface, which provides identity information to various services, for use by the services themselves.

In an additional preferred embodiment, identity store 110 and identity adapter 140 together form a standalone universal identification system, which does not require environment sensing. The service type not sensed internally but rather is specified externally. The universal identification system provides a simpler embodiment which can nonetheless function within a multi-service environment.

In the preferred embodiment identification manager 100 further includes identity provisioner 150. Identity provisioner 150 interfaces with the user to allow the user to generate and/or update his or her identities.

Figure 4:
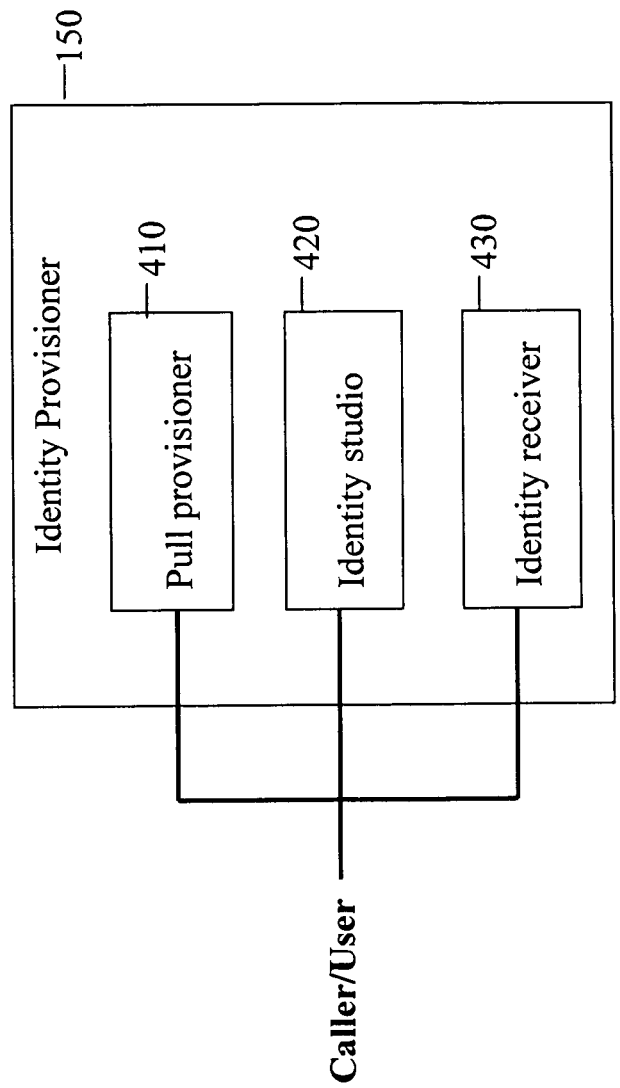

Reference is now made to FIG. 4, which is a simplified block diagram of an identity provisioner, according to a preferred embodiment of the present invention. Identity provisioner 150 may be incorporated into the identification manager or may be a stand-alone unit. Identity provisioner 150 is used by the user to define and update his or her identities, by inputting items such as name, voice signature, photo, icon, avatar, animated GIF, video, hand-written signature, etc. When the identity store has no current record for the user, identity provisioner 150 may instruct identity store 110 to create a record for the user using the information received from the user. Alternately, identity provisioner 150 may create a record and transfer the record to data store 110 for storage. When a record already exists for the user, identity provisioner 150 may instruct the data store to update the record, or may retrieve and update the record and then return the record to data store 110 for storage.

Figure 5:
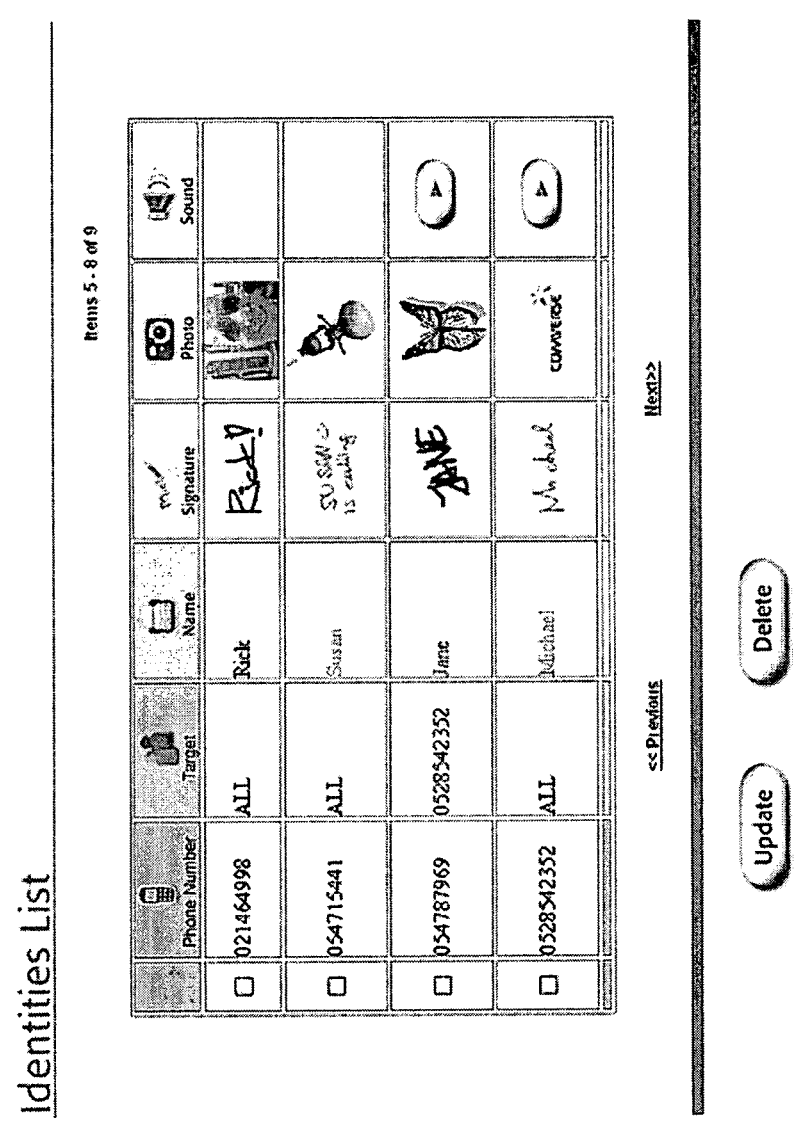

FIG. 5 illustrates an example of a list of identity information which may be stored in identity store 110. Identity store 110 maintains a record for each user containing the user identity information. When it is time to provide the user identity to a destination, the information is provided to the identity provider which formats the appropriate portions of the information for delivery to the destination.

A user may create several identities for different and selective groups of destinations. The association of a group of target addressees with a specific identity may be done using an IMS community server, such as XDMS/GLMS, a Networked Address Book (NAB), or a database of group definitions.

Identity provisioner 150 preferably includes one or more of the following provisioning units: pull-provisoner 410, identity studio 420 and identity receiver 430. Identity provisioning may be automatic (pull-provisioner 410) and/or user-initiated (identity studio 420/identity receiver 430).

Pull-provisioner 410 performs automatic identity provisioning. Pull-provisioner 410 queries the user for at least one portion of the user identity, and incorporates a user response into the appropriate identity. Automatic provisioning is performable with standard mechanisms such as SMS, MMS and interactive voice response (IVR). With SMS/MMS pull provisioner 410 sends the user an SMS/MMS message requesting user details such as name or video. The user replies with the requested information, and the user record is created or updated. With IVR, pull-provisioner 410 initiates a call with an IVR session, and the user replies with voice responses.

Figure 6:
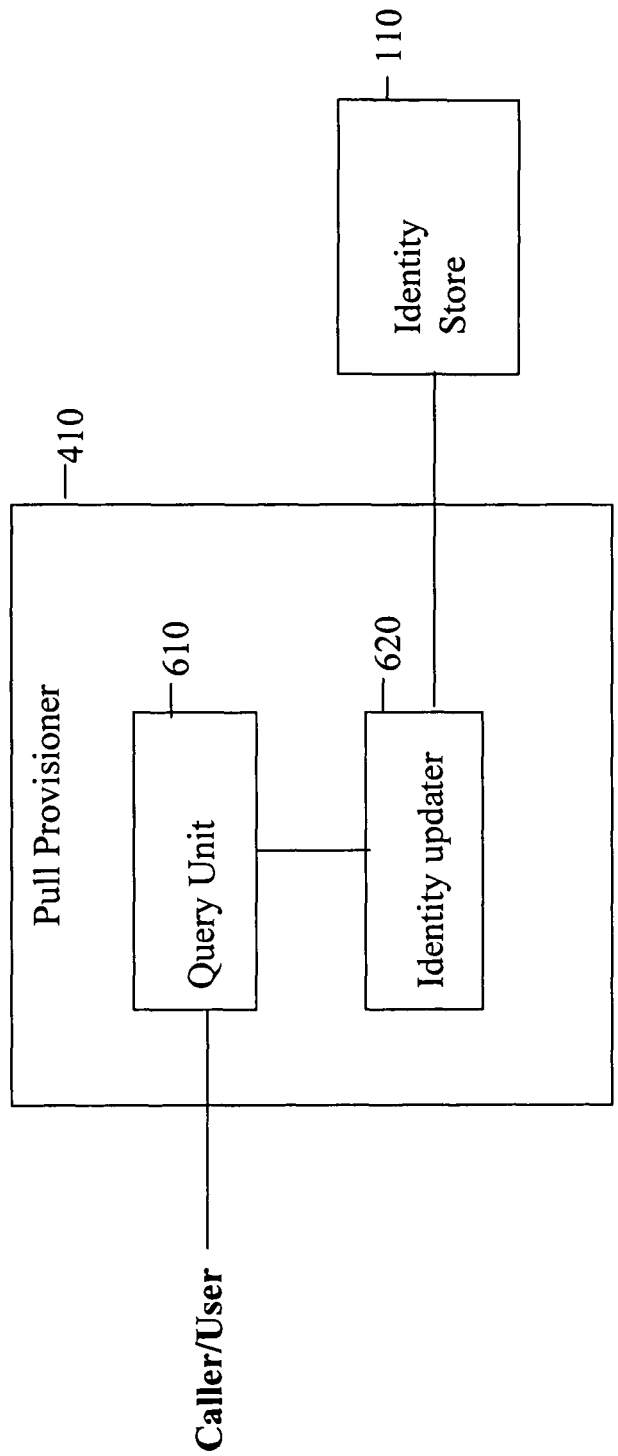

Reference is now made to FIG. 6, which is a simplified block diagram of a pull-provisioner for user-generation of a stored identity, according to a preferred embodiment of the present invention. Query unit 610 queries the user for at least one portion of the user-generated identity (i.e. name, video, photo, etc.). Identity updater 620 incorporates the user response into the appropriate stored identity.

Identity studio 420 is a design tool which enables the user to define his or her identity. Data entry methods are determined by the capabilities of the user terminal, the network over which the identity information is being communicated, and the identity studio itself.

In a first preferred embodiment, identity studio 420 is accessible over the Internet or other data network. The user logs in to the identity studio and defines the identity on-line. In a second preferred embodiment, identity studio 420 is located at the user-end. For example, the identity studio may be accessed over the Web from the user's computer accessed over the Internet from the user's phone, PDA, TV and so forth, or installed as a client on the user device (see below). The identity is designed on the user's computer (or other device) and then transferred to identity provisioner 150.

Figure 7:
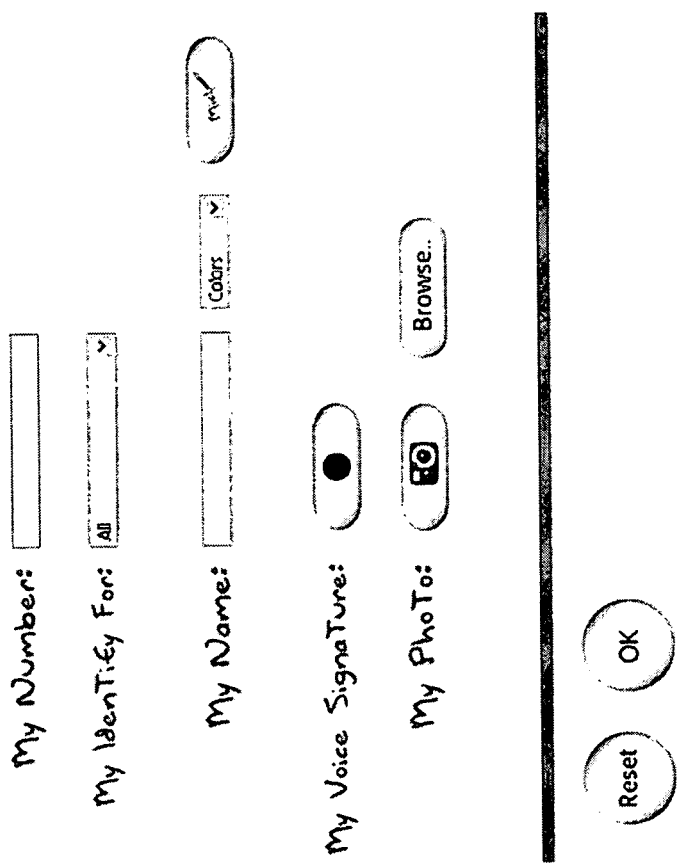
Figure 8:
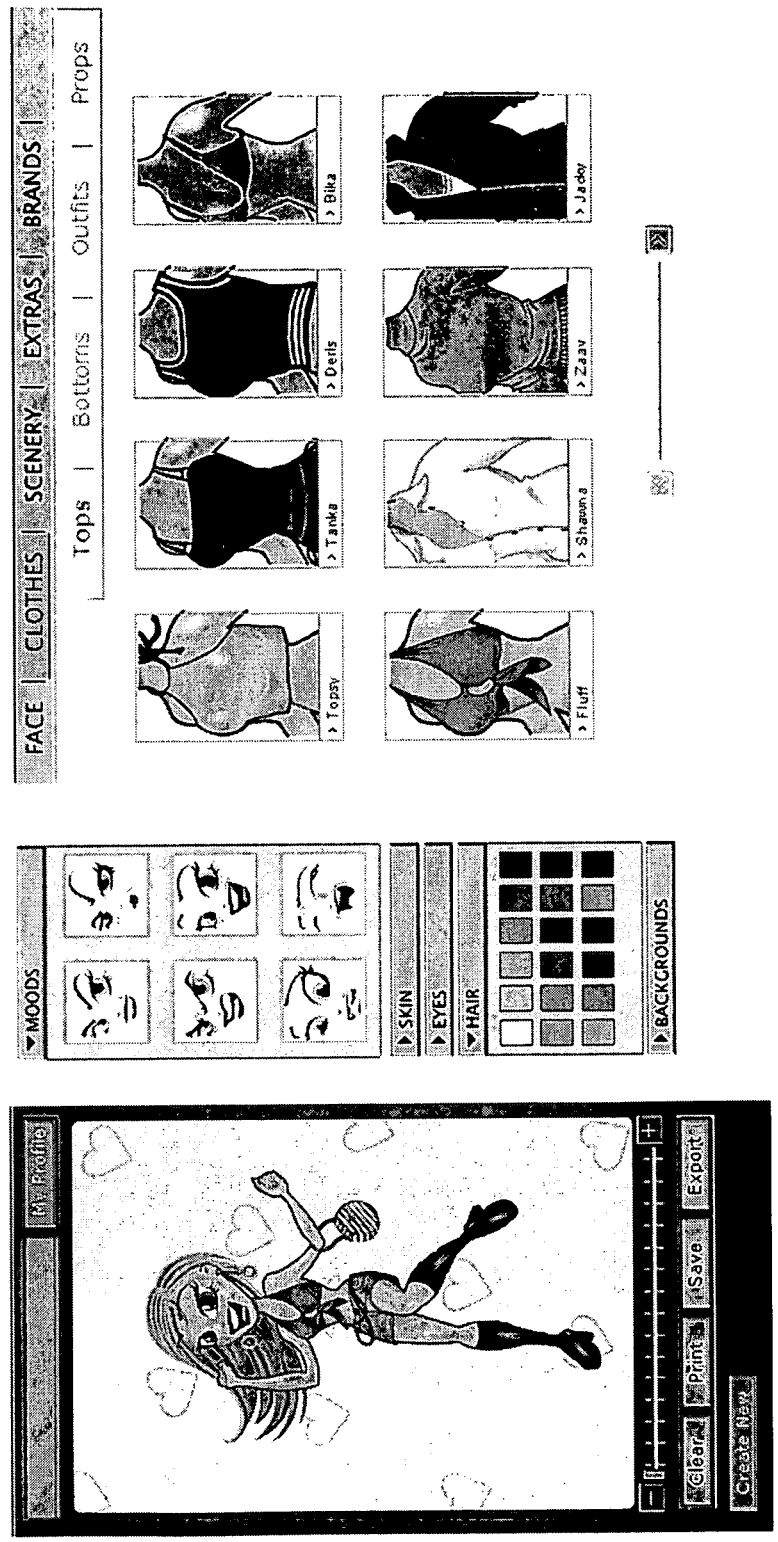

Identity studio 420 provides the user with the tools to define the various portions of the user identity. For example, FIG. 7 shows a form for the user to fill out in order to enter a user number and name, and to provide a photo and voice signature. FIG. 8 shows an example of an avatar design page, in which the user creates an avatar by selecting a face, clothing, scenery and other aspects of the avatar.

Identity provisioner 150 preferably includes identity receiver 430, which receives user communications specifying at least one portion of the identity and incorporates the specified portions into the user's identity. The user communications may originate at the user or may be responses to queries sent to the user.

Figure 9:
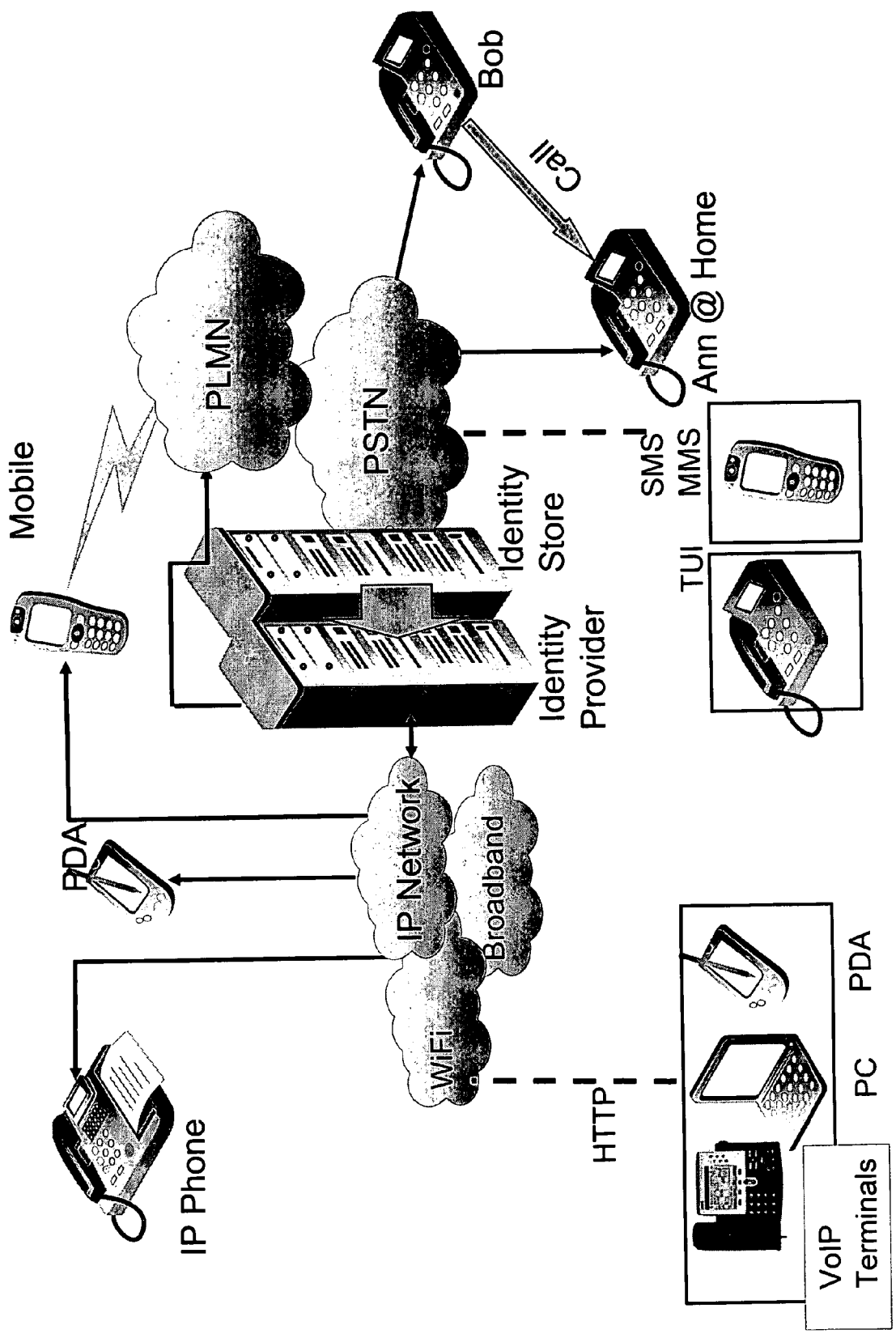

The above mechanisms permit a user to connect to identity provisioner 150 from numerous types of devices over various networks. The simplest telephony devices may connect with a circuit switch call and use a text user interface (TVI) to communicate and provision. More advanced environments (such as networks and handsets supporting IP) may connect over broadband and communicate over IP to load images, sound, video and so forth to identity provisioner 150. FIG. 9 illustrates an exemplary system permitting identity design from multiple types of input devices (including VoIP terminal and telephone, PC, PDA, TV, TVI and mobile telephone), and over different types of communication networks and protocols, both automatic and user-initiated.

Figure 10:
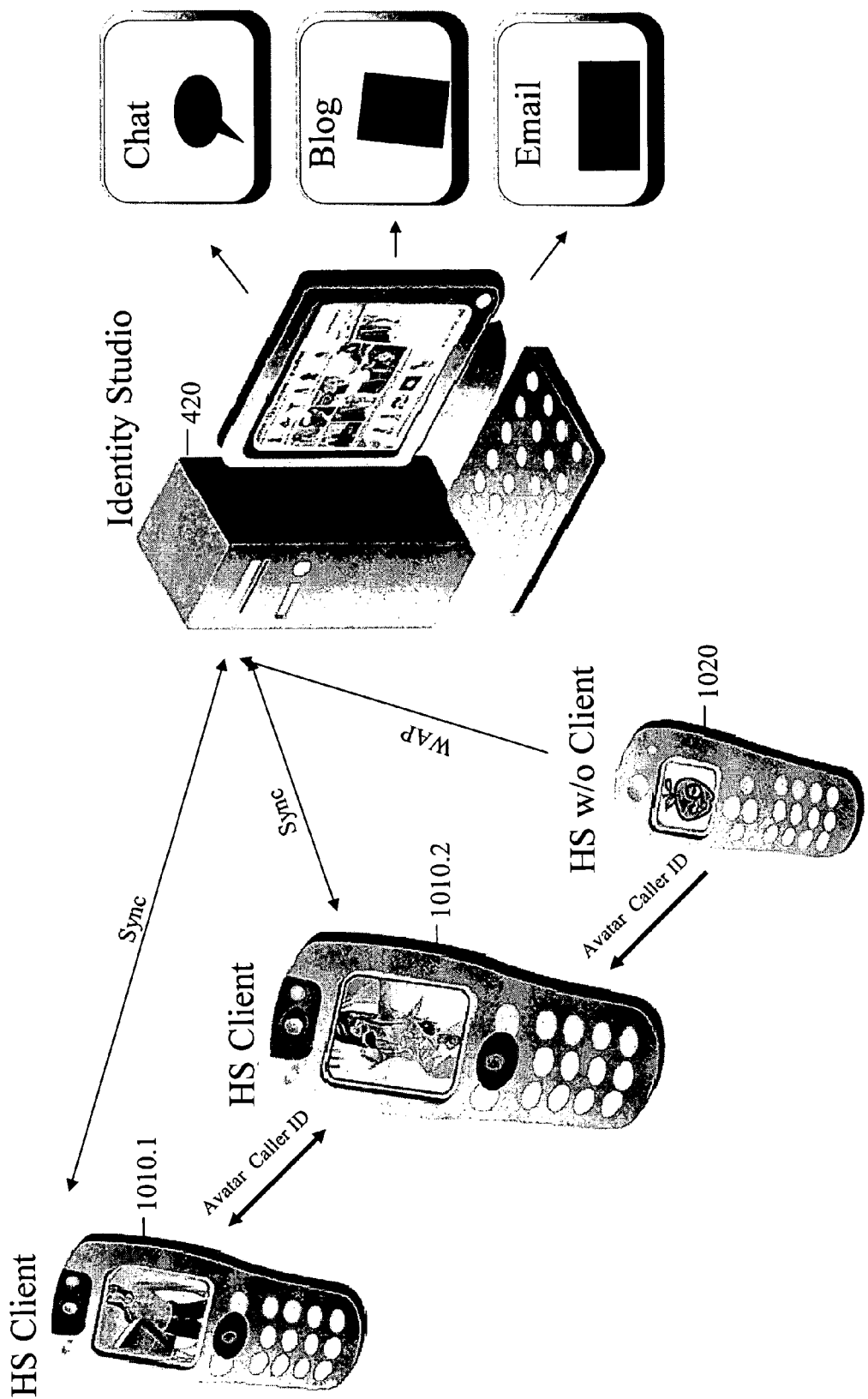

Reference is now made to FIG. 10, which is an exemplary embodiment of an identity studio which receives identity information from user cellular telephone handsets. Identity studio 420 is used to register, create, and distribute avatars. The distributed avatars may be provided not only as caller identification but also to other services such as chat, blog, gaming, dating, visual voice mail, video mail, and email. In FIG. 10, mobile telephone handsets 1010.1 and 1010.2 have an installed client, such as a Brew/Symbina/Microsoft/J2ME client, for performing identity functions, and handset unit 1020 does not have a client. In the present embodiments, the client installed on handsets 1010.1 and 1010.2 allows synchronization of identity information between identity studio 420 and the handset. Handsets 1010.1 and 1010.2 can also perform functions such as updating a Web avatar, changing the avatar on-the-fly and enabling avatar caller ID. Handset 1020 updates the avatar by WAP and loads the avatar using built-in handset capabilities.

The above provisioning elements were described in the context of a user having a single identity. In the case of a user with multiple identities, the user may be required to specify an identity for provisioning.

Once the identity has been provided to the caller/user, the identity must be displayed by the destination device. In order to do so, the destination device requires the capabilities to detect, extract, and display the identity. These capabilities may be built-in to the unit or may require a client which is installed on the destination device.

Figure 11:
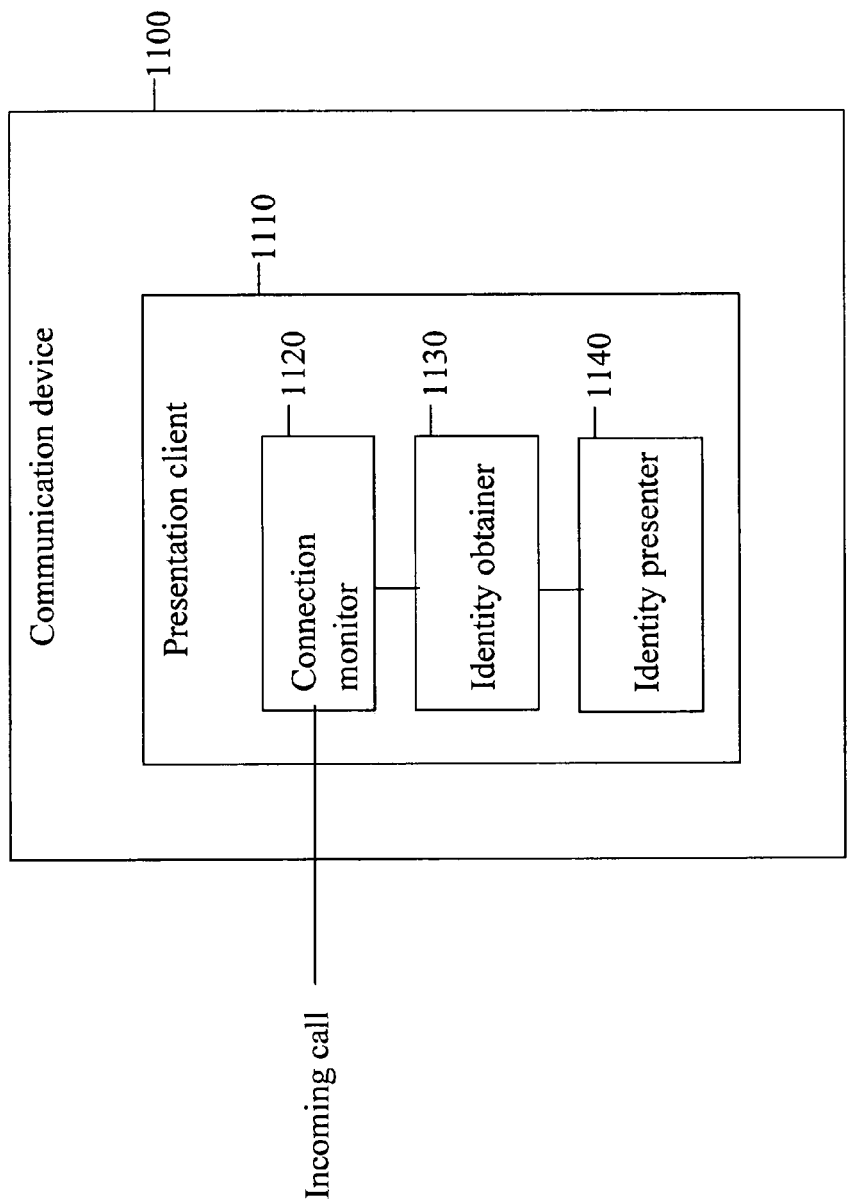

Reference is now made to FIG. 11, which is a simplified block diagram of a communication device with identity display capabilities, according to a first and second preferred embodiments. In the first preferred embodiment identity display capabilities are provided by a presentation client, whereas in the second preferred embodiment the capabilities are built-in. Both embodiments include the same basic building blocks, though implementation may differ. For simplicity, the elements responsible for identity display are discussed in the context of a communication device client.

Communication device 1100 includes a presentation client 1110 that presents the incoming caller identification to the user. Client 1110 includes connection monitor 1120, identity obtainer 1130, and identity presenter 1140. Connection monitor 1120 identifies incoming connections which have an associated caller-generated identity. The manner by which connection monitor 1120 identifies that a given connection has an associated caller identity depends on the means by which the identity is provided to the communication device. For example, connection monitor 1120 may detect the identity information within a header, parse an incoming SMS or MMS, receive a system message with identity content, and so forth. Once connection monitor 1120 detects an incoming message, identity obtainer 1130 obtains the caller-generated identity. For example, if identity information is provided over a separate channel, identity obtainer 1130 extracts the identity information over the second channel. After the identity information has been obtained, identity presenter 140 presents the caller-generated identity to the destination party, preferably in coordination with the incoming connection. Thus the caller identity can serve in place of the ring tone selected for the communication device by the called party. Other possible embodiments include presenting the identity to the user as a missed call notification, as a record of a recently dialed call, or as an entry in an address book.

In an additional embodiment, presentation client 1110 is embodied on a computer-readable medium, and includes: an identity definition routine adapted for defining the user-identity on the communication device and an identity storing routine adapted for sending the user-identity for storage in a database.

In an additional embodiment, presentation client 1110 is embodied on a computer-readable medium. The presentation client includes a connection monitoring routine adapted for identifying an incoming connection as having an associated caller-generated identity, an identity obtainer routine adapted for obtaining the caller-generated identity, and an identity presenter routine adapted for presenting the caller-generated identity on the communication device.

Reference is now made to FIG. 12, which is a simplified block diagram of a communication device with identity generation capabilities, according to a first and second preferred embodiments. In the first preferred embodiment identity generation capabilities are provided as a client, whereas in the second preferred embodiment the capabilities are built-in. Both embodiments include the same basic building blocks, though implementation may differ. For simplicity, the elements responsible for identity generation are discussed in the context of a communication device client. Note that both identity generation and identity presentation may be incorporated into a single client.

Customization client 1210 includes identity designer 1220, for receiving user input to define the user-identity on the communication device and for defining the user identity accordingly. For example, identity designer 1220 may contain an avatar design component, where the user selects the various avatar features from a graphic display. Identity sender 1230 then sends the user-generated identity to identity provisioner 150. The user-generated identity may be sent to identity provisioner 150 by any means within the device capability, such as SMS, MMS, voice message, audio, email, or by synchronizing with identity provisioner 150 over a data connection.

In an additional embodiment, customization client 1210 is embodied on a computer-readable medium, and includes: an identity definition routine adapted for defining the user-identity on the communication device, and an identity storing routine adapted for sending the user-identity for storage in a database.

Reference is now made to FIG. 13, which is a simplified flowchart of a method for providing a caller-generated identity of a calling party to a destination over a telephone connection, according to a preferred embodiment of the present invention. In step 1310 a caller-generated identity is defined in accordance with information provided by the calling party. In step 1320 the caller-generated identity is provided to the destination when a telephone connection is established between calling party and the destination.

The generated identity is preferably saved in a centralized identity store, as described above, and retrieved when needed. Preferably the present method further includes the step of formatting the generated identity in accordance with the destination telephone device, or as otherwise required.

Reference is now made to FIG. 14, which is a simplified flowchart of a method for providing a user-generated identity during a connection to a destination, according to a preferred embodiment of the present invention. In a telephony context the user is the calling party and the connection is made over a telephone network. In step 1410 the originating party and destination of the connection are identified. In step 1420 the identity of the originating party is provided to the destination device in accordance with characteristics of the connection. As discussed above, connection characteristics may include one or more of: the capabilities of the communication network, the capabilities of a destination device, the destination and destination preferences, and the type of service. The present method may further include the steps of determining the characteristics of the connection, and adapting the provided identity to the determined characteristics of the connection. The identity may be retrieved from a centralized identity store.

Reference is now made to FIG. 15, which is a simplified flowchart of a method for the presentation of a caller-generated identity on a communication device, according to a preferred embodiment of the present invention. The present method is performed by the telephone or other communication device. The presentation method includes the steps of: identifying an incoming connection as having an associated caller-generated identity (step 1510), obtaining the caller-generated identity (step 1520), and presenting the caller-generated identity on the communication device, in coordination with the incoming connection (step 1530).

The above-described personalized identity is a revolution in the electronic communication experience as it is known today. The calling/originating party's identity appears to the destination party in a way that is determined by the originator, not the destination. There is no need to maintain an address book, and there is no limitation on the number of entries which can be stored. Adaptation of the identity to the other party's device is not required at either the originating or destination side. Additionally, the user-generated identity described above is suitable for telephone connections, as well as a wide variety of types of electronic connections. Identity generation is a new revenue source for operators, a trigger for increased call completion, uniqueness and branding opportunities, and a useful way to draw in new users and to increase usage by subscribers. The user-generated identity will encourage communication between people and add a new element to this communication.

It is expected that during the life of this patent many relevant communication devices, communication networks, telephones, telephone networks, communication services, input devices, and data stores will be developed and the scope of the terms communication device, communication network, telephone, telephone network, service, input device, and store is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An identification manager, for providing a caller-generated identity of a calling party to a telephone destination over a telephone connection, comprising:
   an identity store, for storing caller-generated identities; and
   an identity provider associated with said identity store, for:
      retrieving, from said identity store, a generated identity of said calling party; thus yielding a retrieved identity;
      determining a capability of a telephone network that provides said telephone connection;
      adapting said retrieved identity to said capability, thus yielding a provided identity; and
      providing said provided identity to said telephone destination in accordance with said capability.

2. An identification manager according to claim 1, wherein said provided identity comprises at least one of: name, text message, ring tone, icon, voice message, avatar, audio clip, video clip, animation clip, animated Graphic Image File CGIF), photograph, logo, and image.

3. An identification manager according to claim 1, wherein said provided identity is provided for the use of a client upon a destination telephone device.

4. An identification manager according to claim 1, wherein said identity provider is further operable to select said retrieved identity from a plurality of generated identities associated with said calling party in accordance with said telephone destination.

5. An identification manager according to claim 1, wherein said identity provider also determines a capability of a device at said telephone destination, and formats said provided identity in accordance with said determined capability of said device at said telephone destination.

6. An identification manager according to claim 1, wherein said identity provider is operable to provide said provided identity over said telephone connection.

7. An identification manager according to claim 1, wherein said identity provider is operable to provide said provided identity during connection setup.

8. An identification manager according to claim 1, wherein said provided identity is provided to said telephone destination as at least one of: Short Message Service (SMS), Multimedia Message Service (MMS), voice message, email, and ring tone.

9. An identification manager according to claim 1, wherein said identity provider is operable to initiate a channel to said telephone destination that is separate from said telephone connection, and to provide said provided identity over said channel.

10. An identification manager according to claim 1, wherein said identity provider is operable to transfer said provided identity to said telephone destination as a portion of a protocol of said telephone connection.

11. An identification manager according to claim 1, wherein said identity provider is operable to provide said provided identity upon query by said telephone destination.

12. An identification manager according to claim 1, wherein said provided identity further comprises dynamically-updated information.

13. An identification manager according to claim 1, further comprising an identity provisioner, for the generation of an identity by a calling party.

14. An identification manager according to claim 13, wherein said identity provisioner comprises a pull-provisioner for querying said calling party for at least one portion of said calling-party identity, and for incorporating a calling party response into said calling-party identity.

15. An identification manager according to claim 13, wherein said identity provisioner comprises an identity studio for designing said calling-party identity.

16. An identification manager according to claim 13, wherein said identity provisioner comprises an identity receiver for receiving a communication specifying at least one portion of said calling-party identity from said calling party, and for incorporating said portion into said calling-party identity.

17. An identification manager according to claim 1, wherein said telephone connection comprises at least one of: Public Switched Telephone Network (PSTN), Public Land Mobile Network (PLMN), mobile telephone, Voice over IP (VoIP), Intelligent Network (IN), second generation wireless (2G), third generation wireless (3G), High Speed Packet Access (HSPA), Wireless Local Area Network (WLAN), Global System for Mobile communication (GSM), Code Division Multiple Access (CDMA), Signaling System 7 (SS7), broadband telephone, and cable telephone.

18. An identification manager according to claim 1, further comprising a connection establisher for establishing said telephone connection.

19. An identification manager according to claim 18, wherein said connection establisher is operable to coordinate said establishing of said telephone connection at a device at said telephone destination, with said providing said provided identity, such that said provided identity serves as a notification of an incoming telephone call.

20. An identification manager according to claim 1, further comprising a telephony infrastructure for maintaining said telephone connection.

21. An identification manager according to claim 1, wherein said identity provider is further operable to provide a user-generated identity of said destination to said calling party.

22. The identification manager of claim 1, wherein said capability is selected from the group consisting of network bandwidth, network configuration, and network congestion.

23. A method for providing a user-generated identity of an originating party during a connection to a destination, comprising:
identifying an originating party and a destination of said connection;
retrieving, from a centralized identity store, a user-generated identity of said originating party; thus yielding a retrieved identity;
determining a capability of a telephone network that provides said connection;
adapting said retrieved identity to said determined capability, thus yielding a provided identity; and
providing said provided identity to said destination in accordance with said capability.

24. The method of claim 23, wherein said capability is selected from the group consisting of network bandwidth, network configuration, and network congestion.

* * * * *